No. 794,982.

Patented July 18, 1905.

UNITED STATES PATENT OFFICE.

FRITZ HOFMANN, OF ELBERFELD, GERMANY, ASSIGNOR TO FARBENFABRIKEN OF ELBERFELD CO., OF NEW YORK, N. Y., A CORPORATION OF NEW YORK.

MONOGLYCOL ESTER OF SALICYLIC ACID.

SPECIFICATION forming part of Letters Patent No. 794,982, dated July 18, 1905.

Application filed November 3, 1904. Serial No. 231,263.

*To all whom it may concern:*

Be it known that I, FRITZ HOFMANN, doctor of philosophy, chemist, residing at Elberfeld, Germany, (assignor to the FARBENFABRIKEN
OF ELBERFELD COMPANY, of New York,) have invented a new and useful Improvement in Monoglycol Ester of Salicylic Acid; and I hereby declare the following to be a clear and exact description of my invention.
My invention relates to the preparation of a new pharmaceutical product, which is chemically the ester of ethylene glycol, $C_2H_4(OH)_2$, and salicylic acid, the monoglycol ester of salicylic acid of the formula

and which according to my researches possesses valuable therapeutic properties, being a good remedy against rheumatism, about three to ten grams being employed for one external application.

The process for producing my new compound consists in treating ethylene glycol and salicylic acid with strong acids in the manner suitable for the method of esterification. It is preferable to employ a surplus of ethylene glycol in order to avoid the formation of the disalicylic ester.
In carrying out my process practically I can proceed as follows, the parts being by weight: A mixture of one thousand parts of salicylic acid, two thousand parts of ethylene glycol, and seventy-five parts of sulfuric acid (60° Baumé) is heated on the water-bath for about from twenty-four to thirty-six hours. After cooling the reaction mass is mixed with nine thousand parts of water and is then shaken with ether after the addition of such a quantity of a sodium-carbonate solution that the mixture is alkaline after being well shaken. The ethereal solution, which contains the new ester, is then separated from the water and dried over anhydrous sulfate of sodium, the ether is driven off, and the residue is distilled *in vacuo*. The new compound thus obtained passes over at 173° centigrade under about fifteen millimeters pressure. It is a limpid odorless oil which refracts light strongly. Its alcoholic solution is colored violet by ferric chlorid. It is split up into salicylic acid and ethylene glycol when reacted upon by caustic alkalies.

Having now described my invention and in what manner the same is to be performed, what I claim as new, and desire to secure by Letters Patent, is—

The herein-described new monoglycol ester of salicylic acid having the above-given formula and being a limpid odorless oil boiling at 173° centigrade under a pressure of about fifteen millimeters; the alcoholic solution being colored violet by ferric chlorid; being split up into salicylic acid and ethylene glycol when reacted upon by caustic alkalies; and exhibiting valuable therapeutic properties, substantially as hereinbefore described.

In testimony whereof I have signed my name in the presence of two subscribing witnesses.

FRITZ HOFMANN.

Witnesses:
   OTTO KÖNIG,
   HINR. ATLEFELDER.